(12) United States Patent
Mani-Meitav et al.

(10) Patent No.: US 7,596,713 B2
(45) Date of Patent: Sep. 29, 2009

(54) FAST BACKUP STORAGE AND FAST RECOVERY OF DATA (FBSRD)

(75) Inventors: Irit Mani-Meitav, Atlit (IL); Assaf Sarfati, Tiv'on (IL)

(73) Assignee: Intranational Business Machines Corporation, Armonk, NY (US)

( * ) Notice: Subject to any disclaimer, the term of this patent is extended or adjusted under 35 U.S.C. 154(b) by 490 days.

(21) Appl. No.: 11/122,508

(22) Filed: May 4, 2005

(65) Prior Publication Data

US 2005/0216788 A1    Sep. 29, 2005

Related U.S. Application Data

(63) Continuation of application No. PCT/IL03/00985, filed on Nov. 20, 2003.

(60) Provisional application No. 60/427,880, filed on Nov. 20, 2002.

(51) Int. Cl.
*G06F 11/00* (2006.01)

(52) U.S. Cl. .............. 714/6; 714/52; 709/202; 709/203; 707/200; 707/202

(58) Field of Classification Search ............... 709/202, 709/203; 707/202, 200; 714/6, 52
See application file for complete search history.

(56) References Cited

U.S. PATENT DOCUMENTS

| | | | |
|---|---|---|---|
| 5,608,865 A * | 3/1997 | Midgely et al. ............... 714/1 |
| 5,664,186 A | 9/1997 | Bennett et al. |
| 6,148,383 A | 11/2000 | Micka et al. |
| 6,401,098 B1 * | 6/2002 | Moulin .................. 707/102 |
| 6,446,085 B1 * | 9/2002 | Gusler et al. ............. 707/200 |
| 6,546,474 B1 * | 4/2003 | Weigelt .................. 711/162 |
| 6,647,400 B1 * | 11/2003 | Moran .................... 707/205 |
| 6,757,698 B2 | 6/2004 | McBride et al. |
| 6,948,038 B2 * | 9/2005 | Berkowitz et al. ......... 711/162 |
| 6,985,901 B1 * | 1/2006 | Sachse et al. .............. 707/10 |
| 7,082,456 B2 * | 7/2006 | Mani-Meitav et al. ...... 709/203 |
| 7,155,465 B2 * | 12/2006 | Lee et al. ................ 707/204 |
| 7,185,048 B2 * | 2/2007 | Arakawa et al. .......... 709/202 |
| 2002/0083120 A1 * | 6/2002 | Soltis .................... 709/200 |
| 2004/0098415 A1 * | 5/2004 | Bone et al. .............. 707/200 |
| 2006/0106818 A1 * | 5/2006 | Reed et al. .............. 707/100 |
| 2007/0136381 A1 * | 6/2007 | Cannon et al. ........... 707/200 |

FOREIGN PATENT DOCUMENTS

DE   199 37 423 A1   4/2003
WO   WO 9912098 A1 *   3/1999

* cited by examiner

*Primary Examiner*—Michael C Maskulinski
*Assistant Examiner*—Jeison C Arcos

(57) ABSTRACT

A Fast Backup Storage and fast Recovery of Data (FBSRD) method for a facility, preferably with a SAN, coupled to a network with servers and workstations, operating in both a storage mode and a recovery mode. Coupled to the network are a primary storage, a repository, and a Backup Appliance computer BA. The BA runs a Backup Computer Program in association with at least one computer. When in storage mode, data is retrieved out of primary storage for back up, by taking snapshots and saving the retrieved data into repository in block format. In recovery mode, backed-up data is retrieved from repository and recovered into primary storage in either one of both block format and file format. The BA runs interactively with an Agent Computer Program residing in each server and workstation, and with a Backup User Interface management computer program operated by a user.

16 Claims, 5 Drawing Sheets

FAST BACKUP STORAGE AND FAST RECOVERY OF DATA (FBSRD)

The present application claims the benefit of Provisional Application Ser. No. 60/427,880 filed on Nov. 20, 2002 and is a Continuation of PCT/IL03/00985 filed on Nov. 20, 2003, all in English.

TECHNICAL FIELD

The present invention relates to fast data backup and to fast recovery or restoration of data at disk-to-disk speed, and in particular, to data back-up storage in block format, and to fast recovery of data in both block format and file format from the same block format stored backup data.

GLOSSARY

Computer: a machine, which executes computer program's instructions recorded on a computer readable medium, also having a memory for storing computer programs, and coupled to a communication link.

LAN: Local Area Network such as an Ethernet; used for communications between computers located in near physical proximity (typically less than 500 m).

TCP/IP, Sockets: a common protocol for data communications, and a common interface to data communications protocols used by computer programs.

SAN: Storage Area Network such as Fibre Channel; a high speed, dedicated network used to connect a number of computers with storage devices.

Workstation: a computer attached to the LAN but not to the SAN.

Server: a computer attached to the LAN and to the SAN.

Primary storage device: a block storage device (usually a disk) used by a computer to store non-volatile data.

SAN Fabric: The hardware that connects workstations and servers to storage devices in a SAN. The SAN Fabric enables any-server-to-any-storage device connectivity through the use of Fibre Channel switching technology.

Server Cluster: a plurality of servers sharing access to the same file-system on a shared primary storage.

Computing Facility: a facility comprised of a number of servers and workstations, connected by a LAN and possibly sharing primary storage through a SAN.

Fibre Channel: a standardized serial data transfer architecture optimized for data transfer between computers and storage and commonly used in SAN environment.

iSCSI: an IP-based standard for linking data storage devices over a network. iSCSI enables a SAN to be deployed in a LAN, WAN, or MAN.

InfiniBand: An I/O architecture and a specification for the serial transmission of data. InfiniBand can carry multiple channels. Also a Trade Mark.

Direct Attach Storage: DAS, or primary storage device coupled by a direct communication link to a computer, as opposed to a primary storage, which is coupled via a SAN.

Data Block: a fixed-size unit of a number of consecutive sectors accessed as a single unit.

Block format: A method of organizing data. Data in block format is organized as at least one consecutive data block and tagged with physical location information, which is preserved together with the data. The block structure is flat, meaning that there is no association of blocks into a higher-level structure.

Operating System (OS): a software program used to control computer resources such as I/O operations, memory resources and program execution.

File System: a software program used to organize, access and modify information in a hierarchical logical structure. A component of the computer's OS.

File-System Data: information organized by a File-System as a logical structure and stored on non-volatile media.

File system volume: a volume, or fixed amount of storage, managed by a system that an operating system uses to organize and keep track of file system data such as directories and files.

File: a file-system object accessible as a unit by a file-system and having associated data and attributes such as name, size, access permissions and access times.

Directory: a special type of file used by a file-system to aggregate a group of files in a logical list.

Directory Tree: a commonly-used logical tree structure of directories used by a file-system to assign a logical location and relationships to each file in the file-system.

File Format: a method of organizing access to data as files, usually by specifying file names and a path through the directory structure to files.

File-System Meta Data: higher-level information used by a File-System to manage the organization of File-System data and stored on non-volatile media, such as information stored on data blocks and configured to allow a file system computer program to organize the information as a file system.

Node-Table: the part of the file-system meta-data containing a list of all the files in the file-system and containing, for each file, a list of physical data sectors containing the file's data.

Used-Sectors List: the part of the file-system meta-data containing a list of all the sectors containing file-system data and meta-data.

Disk Layout Meta Data: higher-level information used to manage the information stored on a disk, indicating in a first case, a list of file-system volumes on a primary storage device as well as attributes of each file-system volume such as name, type and extent, and, in a second case, indicating the attributes of the selected file system volumes.

Backup Client: a computer running a computer program application, called Agent Computer Program (ACP), to protect potential data alteration during an ongoing data backup operation.

Source data: original data taken at the source, which can be files, directories, or devices.

Target: an area designated for the storage of data.

Repository: a storage device for storing source data backed-up from primary storage.

Snapshot: a backup operation performed when in storage mode.

Snapshooting: the action of taking one or more snapshots.

Incremental data block: a data block that has been modified by additional data since a previous snapshot.

Valid data block: a data block containing user data or meta-data.

Backup connectivity: a computer program or a device's ability to link together with other programs and devices for performing a backup operation.

Non-blocking I/O operation: standard OS term for an I/O operation such as reading data from a file, which allows the calling application to continue execution during the often significant time until the I/O operation completes execution.

Inconsistent data: data modified by a write command occurring during an ongoing snapshot.

BACKGROUND ART

Current Network-Based back up and restore systems are primarily tape-based, where a number of generations exist:

Stand alone backup and restore systems, with a tape device attached directly to a computer.

Server and LAN based backup and restore systems: where the data is being moved from storage to tape via the server and the LAN.

LAN-free backup and restore systems: move the data over the SAN to the tape.

Early disk-based backup and restore systems are used for buffering the data on a dedicated disk before it moves into tapes. These systems are sometimes called tape emulation or virtual tape.

LAN- and Server-free backup and restore systems, which use a third-party Data Mover to copy backup data over the SAN.

Disk-based backup and restore systems, the latest generation, which practically does not exist yet.

U.S. Pat. No. 5,664,186 to Bennet et al. teaches a file management and backup system operating in file format, whereas the present application is not limited thereto but operates in either one of both file format and block format.

DISCLOSURE OF THE INVENTION

In a computing facility with a plurality of interconnected computers, problems are encountered which prevent the fast storage of data to be backed up, as well as the fast restoration of data.

FIG. 1 illustrates a prior art computing facility with a local area network, or LAN. A plurality of workstations 1 and of servers 3 are coupled to a network 5, such as a LAN 5. Each one of the workstations 1 and of the servers 3 has at least one primary storage 9 coupled as a Directly Attached Storage (DAS) memory, although not shown in FIG. 1. In addition, there is a backup server 11 and a tape storage device 13 for data backup operations.

FIG. 2 illustrates a prior art network system in a SAN environment. A plurality of workstations 1 and of servers 3 are coupled to a network 5, such as a LAN, and also to a Storage Area Network 7, or SAN 7. In turn, at least one primary storage 9 is coupled to the SAN 7, for use as a shared primary storage, by at least one of the workstations 1 and servers 3 attached thereto.

It is noted that the difference between workstations 1 and servers 3 is purely semantic: a workstation is a computer used mostly to run computer programs interacting with a computer operator, while a server is a computer used mostly to run computer programs interacting with others computers. In a typical computing facility with a SAN-environment, only servers 3 are attached to the SAN 7 while workstations 1 access SAN-coupled primary storage 9 through the LAN 5 and the servers 3.

Specifically, one of the problems with backup operations is that enterprise data backup is a time-consuming, expensive, and at times, an unreliable practice. While the volume of data generated in an average enterprise is increasing, the time available for backup is decreasing and backup is conducted much more frequently. Building an effective data protection system requires a large investment in servers, networks, tape technology, and proficient people, in addition to the recurring costs of data storage media, such as tape media. Tape-based back up and restore operations often interrupt business operations and data availability, costing money and lowering productivity.

Likewise, one of the problems with data restoration operations is that restore operations are extremely slow and labor-intensive: most restore operations target a small amount of data, typically a single file or directory, but restoring that data requires locating the appropriate tape or set of tapes, and the mounting thereof, allocating enough disk space for restoring the whole volume of data, actually restoring the whole volume of data, and then locating the desired files or directories. Often, the whole process may have to be iterated until the desired file is located. In addition, restoring a corrupted or destroyed volume requires a separate, dedicated block-level backup and restore process, since file-level backup cannot restore system files.

The solution to the aforementioned problems is provided by the Fast Backup Storage and fast Recovery of Data (FB-SRD) method, implemented as a product and a system described below, which operate both in storage mode and in recovery mode. The FBSRD is achieved mainly by the addition to a computing facility of a Backup Appliance 17, or BA 17, of a repository 15, and of a Backup Computer Program BCP, not shown in the Figs. The BCP runs on various computers of the facility as several interdependent computer programs, which are: a Backup Manager Computer Program (BMCP) running on the BA 17, operating interactively with at least one Agent Computer Program (ACP), running on computers of the facility (note that a backup client is defined as a computer running an ACP) and with a Backup User Interface management computer program (BUI), running, when desired, on a workstation.

With reference to FIG. 3, there is shown an embodiment 100 of an FBSRD system. Similar reference numerals and characters refer to similar elements in the various Figs. As stated above, two hardware elements have been added to the computing facility, namely the BA 17 coupled to the local network 5, or LAN 5, and the repository storage device 15, or repository 15, coupled directly to the BA 17 via a dedicated link 6. The repository 15 is a storage area that may be implemented as a stand-alone dedicated storage device, as shown in FIG. 3, or as a storage area within the primary storage 9, not shown, but coupled to the BA 17, or as a combination of both.

With reference to FIG. 4, there is shown an embodiment 200 of an FBSRD system in a computing facility with a SAN environment. The BA 17 is coupled to the LAN 5 and to the SAN 7, and the repository 15 may be implemented as a stand-alone dedicated storage device, or as a storage area within the primary storage 9, or as both. The repository 15 may be coupled directly to the BA 17, as shown in FIG. 3, or may be coupled to the BA 17 through the SAN 7, as shown in FIG. 4.

With the FBSRD it becomes possible to back-up data of various types, even databases, or DBs, and operating systems, or OSs. To this end, backup is usually performed as a sequence of successive snapshots taken at discrete points in time. The backup operation proceeds at disk-to disk speed, but requires only minimal storage resources since only changed data, thus incremental data relative to a previous snapshot, is saved. Backed-up data is saved in block-level format as sequential data blocks. Thereby backup proceeds at disk-to-disk speed, and benefits from copy operations that process data in raw disk block format, thus minimizing disk I/O operations and disk R/W head movements. Backing up data at block level has the additional advantage of avoiding the need to back up all the data included in a large file, such as a database, when only a small part of the file has changed, such as is the case for the common event of updating a small number of database records.

For data restoration, advantage is taken from raw block disk format to restore an exact image of a disk, of a volume, or of a file. An additional backup data analysis process allows restoration of data at higher level, or meta data level, such as files and directories or database information, even though data is backed-up in lower format as data blocks. In addition, the storing of incremental data makes available a full history of all discrete data taken as snapshots, with all changes, additions and deletions, and the ability to restore data from any point along its history when a snapshot has been taken.

SUMMARY

It is a main object of the present invention to provide means for fast data backup and for fast recovery of data at disk-to-disk speed, for data back-up storage in block format, and for fast recovery of data in both block format and file format from the same block format stored backup data.

It is an object of the present invention to provide a method for Fast Backup Storage and fast Recovery of Data (FBSRD) operating both separately and simultaneously in a first storage mode and in a second recovery mode in a computing facility. The facility includes a network for communication, at least one computer CP coupled to the network, for operation by a user and for managing user data, and a primary storage coupled to the at least one CP and configured as a first data storage memory for storing therein data managed by the at least one CP. The method comprising the steps of:

coupling a Backup Appliance computer BA to the network, where the BA is a computer with an OS comprising a file-system, providing a repository coupled to the BA, and configured as a second data storage memory, and operating FBSRD by running a Backup Computer Program (BCP) in association with the at least one CP and with the BA, comprising: in storage mode:

retrieving data out of primary storage for back-up, by taking snapshots of data at predetermined successive time intervals, saving the retrieved data into repository in block format, and in recovery mode:

recovering backed-up data out of the repository for use by the at least one computer only, and recovering data into primary storage in either one of both block format and file format.

It is a further object of the present invention to provide a method wherein the computer facility further comprises:

at least one server coupled to the network for managing user data, the method being further characterized by the steps of:

coupling a SAN to the at least one server and to the BA,
providing at least one primary storage coupled to the SAN,
using the at least one server to store user data on primary storage via the SAN, and using the BA to access primary storage via the SAN.

It is another object of the present invention to provide a method wherein:

the primary storage and the repository comprise at least one non-volatile data storage memory selected, alone and in combination, from the group consisting of internal computer memory, direct attach storage memory, LAN-coupled memory, and SAN-coupled memory, and further comprising:

coupling the repository to the BA via at least one communication link, and configuring the primary storage and the repository as random access Read/Write (R/W) disk storage devices for transferring data by disk-to-disk data transfer at disk-to-disk speed, both when in storage mode and when in recovery mode.

It is yet another object of the present invention to provide a method wherein the backup computer program (BCP) further comprises:

a Backup Manager Computer Program (BMCP) running interactively with at least one Agent Computer Program (ACP) and with a Backup User Interface management computer program (BUI), the method further comprising the steps of:

running the BMCP on the BA for managing operation of the FBSRD, running the ACP on the at least one CP, for monitoring and for protecting access by the at least one CP to primary storage, and running the BUI, when desired, on a workstation coupled to the network, for enabling a user of the BUI-running workstation to select and define therewith a backup configuration of computing facility devices operating FBSRD, and for visualization of current FBSRD-process status of the computing facility.

It is still another object of the present invention to provide a method wherein operating the BUI-running workstation, further comprises the steps of:

designating a data backup range as spanning from at least one volume out of a plurality of file-system volumes residing in primary storage to an entire primary storage, selecting the data in the designated backup range as source data for backup, defining a first snapshot initiation time and a time-interval between successive snapshots, and defining additional parameters for controlling backup operations, such as total number of successive snapshots in a sequence, and further snapshot timing parameters.

It is yet a further object of the present invention to provide a method wherein backup is achieved in storage mode by snapshooting primary storage, characterized by the steps of:

enabling protection of data comprised in an ongoing snapshot for the duration thereof, to prevent storage of inconsistent data caused by write instructions emanating from any computer, such as a backup client, coupled to the primary storage from which the ongoing snapshot is being taken, and taking a snapshot for storing data in repository in block level data format, by copying data according to either one of both:

copying only selected data blocks which are detected as being valid data blocks when the ongoing snapshot is a first initiated snapshot in a sequence of snapshots, and copying only selected data blocks, which are detected as being incremental and valid data blocks relative to a previous snapshot.

It is still a further object of the present invention to provide a method wherein a snapshot of data backed-up in block-format in the repository is processed for recovery in file-level format to at least one computer CP, characterized by the steps of:

running the BMCP for building and for storing in repository of a catalog comprising file-level system information, and of a Look-Up Table (LUT) comprising block-level data location information, the catalog and the LUT information being mutually indexed for association with data in the snapshot, running the BMCP for recovering a file selected from the snapshot by associating therewith indexed information saved in the catalog and in the LUT file, and recovering the file from the BA, via the network, to the at least one computer CP.

It is furthermore an object of the present invention to provide a method wherein building the catalog is characterized by the steps of:

running the BMCP for access and for analysis of file-system information pertaining to a file system comprising a plurality of objects stored as a snapshot of data blocks in repository, analyzing the snapshot for deriving therefrom and accordingly indexing file-system type and file-system meta-data, analyzing the derived file-system meta-data for deriving therefrom and indexing file-system attributes of all objects out of the plurality of objects in the file-system, comprising file and directory information such as names and relative location, and building a catalog in file-system catalog format, and comprising, file-system information format, file-system type, file-system structure, file-system data, and file-system meta-data.

It is moreover an object of the present invention to provide a method wherein, when in recovery mode, for both recovery into primary storage and for executing analysis by running an application computer program in file-level format of a file selected from a snapshot residing in repository in block format, is characterized by the steps of:

a. reading file-system information from the catalog, b. reading data block information from the LUT, c. associating and converting the data read in steps a. and b. into organized file-system format data, d. sending the organized data through the network to the at least one CP, and e. using the organized data received by the at least one CP as file-system information source for operations, such as for executing saving to primary storage and for executing analysis by running an application computer program.

It is one more object of the present invention to provide a method wherein, when in recovery mode, recovery of block-level data is further characterized by the steps of:

selecting a snapshot stored in repository in block-level format as source data to be recovered by a recovery operation, allocating a region in primary storage for storage of data recovered in original location, the region being defined as a target, running the BCP for enabling protection against attempts by a backup client associated with a volume of data located in the target, to access the target, by detaching or dismounting the volume of data from the backup client's file system, reading data and location information from the selected snapshot, as recovered data, and writing the recovered data as data recovered to original location in the target, by running the BCP, reattaching or remounting to the backup client's file system, any file system volume currently located in the recovered region, if desired, by running the BCP, thereby providing access to backup clients associated with the recovered volume of data.

It is yet one more object of the present invention to provide a method for block-level recovery when in recovery mode, further characterized by the steps of:

running a Read File System, or RFS computer program on a server coupled to a repository via a SAN, selecting from the repository and attaching or mounting of a selected snapshot as a selected file system, running the server's file-system to access file data and file meta-data stored on and previously created from the selected snapshot, running the RFS for accepting all data block read-requests from the server's file system directed to the selected volume when either one of both file data and file meta-data is requested, using data retrieved from a Look Up Table (LUT) pertaining to the selected snapshot and stored in repository to locate the requested data block in the repository, and reading the requested data block(s) from the repository, whereby the server may access file system information from a snapshot stored in repository in block-level format.

BRIEF DESCRIPTION OF THE DRAWINGS

In order to understand the invention and to see how it may be carried out in practice, preferred embodiments will now be described, by way of non-limiting examples only, with reference to the accompanying drawings, in which:

FIG. 6 shows details of the building modules of an agent computer program ACP, and.

BEST MODES FOR CARRYING OUT THE INVENTION

Figure 3:
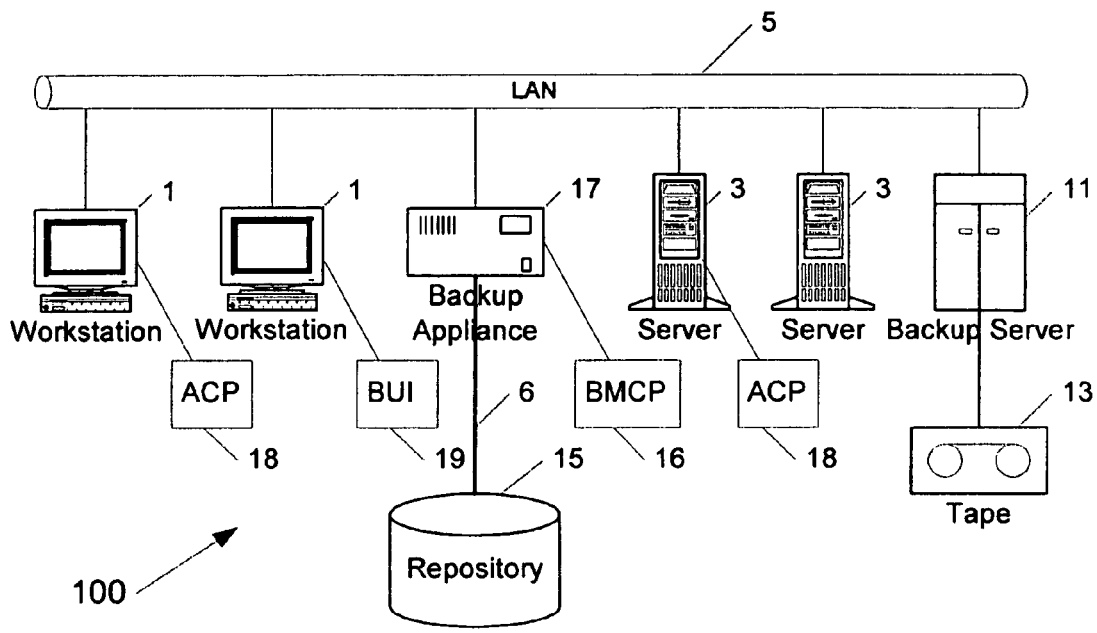
FIG. 3 shows an embodiment 100 of an FBSRD system.
Figure 4:
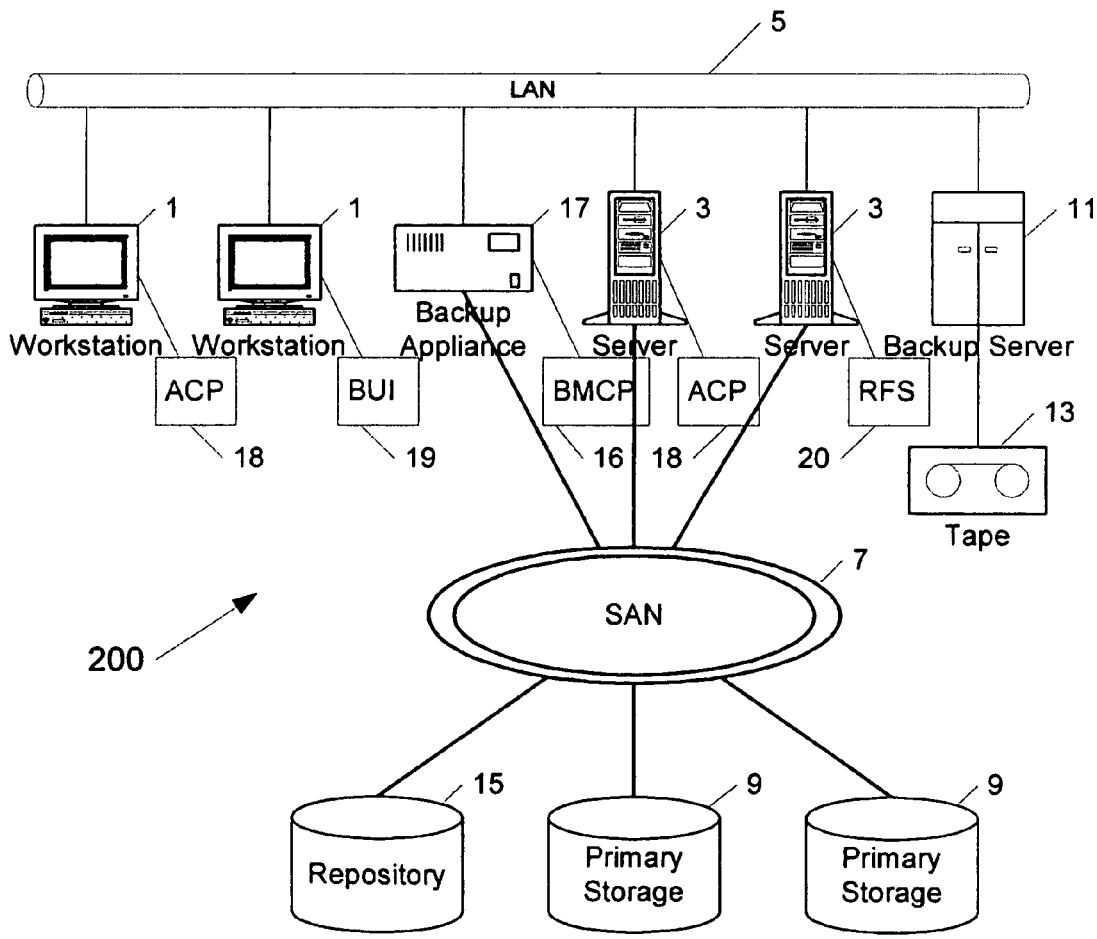
FIG. 4 presents an embodiment 200 of an FBSRD system in a computing facility with a SAN environment, FIG. 5 details most of the components of a backup manager computer program BMCP.

In broad terms, with reference to FIGS. 3 and 4, the Fast Backup Storage and fast Recovery of Data (FBSRD) is a method to be implemented as a FBSRD system with a network 5 for communication, or local area network 5 (LAN 5), preferably in a storage area network 7, SAN 7, environment. The LAN 5, such as an Ethernet, is coupled to workstations 1 operated by users, not shown, and to computing machines or computers, such as servers 3 or hosts 3. The SAN environment consists of the SAN fabric, servers 3, and primary storage devices 9 coupled thereto. The aim of the FBSRD method is to assure fast data backup storage of newly created or modified data, while permitting almost instantaneous data recovery response, e.g. for the replacement of lost or corrupted data. The word "data" is used as a generic term since in the present context it is regarded not only as user created data but also as computer program data such as pertaining to an operating system (OS), or as information residing in a database. This means that any data, such as data files, data bases (DBs), and OS files may be recovered instantaneously if damaged or lost.

Figure 1:
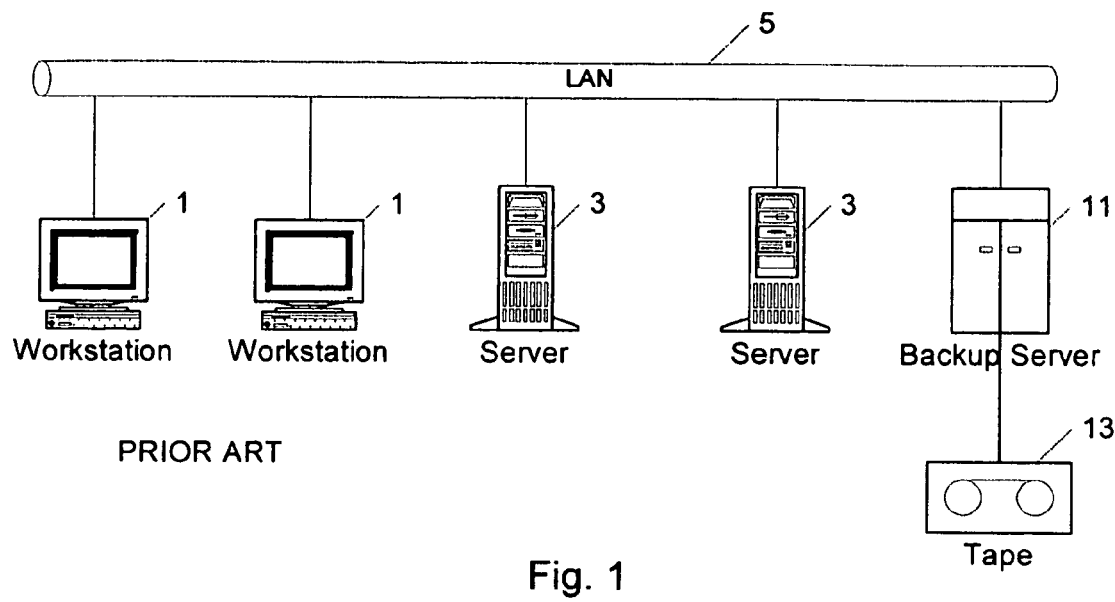
FIG. 1 illustrates a prior art computing facility with a local area network.
Figure 2:
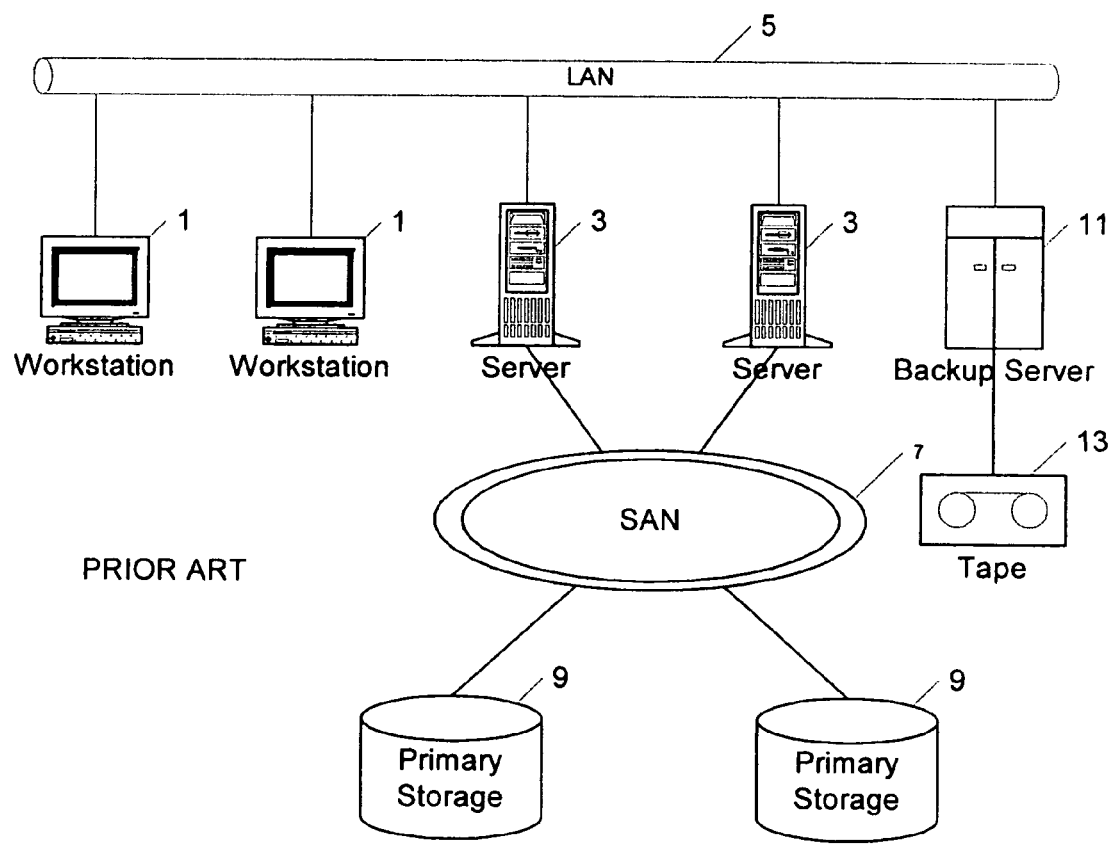
FIG. 2 depicts a prior art network system in a SAN environment.

Although not indicated as such in FIG. 1, workstations 1 and servers 3, which are computers, are referred to as backup clients 4.

The present application takes advantage of a prior U.S. patent application Ser. No. 10/221,882, filed on 16 Sep., 2002, which is incorporated herewith in whole by reference, amongst others, in relation to metadata tables, to the update engine, and to the process for building and searching the catalog.

The FBSRD method operates in two distinct modes: first, in storage mode, and second, in recovery mode.

In the storage mode, source data is backed up from primary storage 9 to a repository 15. Primary storage 9 may be owned by one or more servers 3, coupled to a workstation, or may be a storage device coupled to the SAN 7 and not currently owned by any server. Data is backed up at the data block level, thus in block format. However, to save physical storage space, only valid blocks of data are backed up, and then, only incremental data blocks. A data block is defined as valid when it contains user data or meta-data; and a data block is defined as an incremental data block when it contains additional data, or modified data, in comparison to data stored in any last or previous data storage operation.

In the recovery mode, data previously backed up to the repository 15, is made available for browsing, for access by user operated computer application programs, and for writing back to primary storage 9, when in restore operation.

The FBSRD may concurrently reside in storage mode for operating a backup procedure on one or more sets of data, while simultaneously residing in recovery mode, for running the recovery of other sets of backed up data. The only limitation to the FBSRD is that the same set of data cannot be operated on at the same time in both backup and recovery modes.

In storage mode, data is saved by taking consecutive snapshots, or point-in-time snapshots, of data increments only. Furthermore, snapshooting is repeated at predetermined time intervals, and in successive repetition. Evidently, the first snapshot views all existing data residing in the primary storage 9 as an increment, but for a next snapshot to be taken, the last existing data must present an increment relative to a previous snapshot.

Each single snapshot is associated with a catalogue specific to the snapshot and listing attributes pertaining to the snapshot, such as snapshot version, number, device from which the snapshot was read, source data location, date, and time of the snapshot. Catalogued data permits to retrace the chronological history of any portion of backed up data, and may be used for calling up a string of successive snapshots, out of storage from a data storage repository 15. A database of catalogues contains the various catalogues, which are specific to each single snapshot. Hence, in recovery mode, a chosen version of a certain set of data may be selected, then "stringed up" and restored, starting from say one given snapshot-point in time to another snapshot-point in time.

The repository 15, or data repository 15, is used to store source data backed-up from the primary storage 9. The repository 15 may reside in a dedicated storage device, or span across one or a plurality of primary storage devices 9. The primary storage 9 containing the repository 15 may be coupled to the BA 17 by a dedicated link 6 or it may be coupled to the SAN 7. The storage devices of the FBSRD are selected to allow random access, to permit high-speed exchange of data at disk-to-disk speed. Thus, the backup connectivity required for the source data storage devices, i.e. for the primary storage devices 9, as well as for the repository devices 15, must be implemented as disks of one kind or another, to allow fast memory access. Such storage devices are for example, magnetic disks or arrays of magnetic disks, optical, or magneto-optical disks.

In a SAN, the environment provides storage concurrently accessible to a large number of computing devices, and the transfer of data occurs over a dedicated network, i.e. the SAN 7, nowadays mostly implemented in Fiber Channel architecture, but possibly also practical in other types of architectures, such as iSCSI and InfiniBand architecture for example. It is simple to take advantage of the SAN 7 as the network for the transfer of data, while communicating, concurrently and in parallel, control information regarding the flow of that data over the local network system 5. The network system 5 is preferably implemented as a LAN.

If a primary storage 9 is not coupled directly to the SAN 7, data can be transferred to the primary storage 9 over the LAN 5. This method of data transfer uses the computer, here the backup client 4, to which the primary storage 9 is attached, to read and write data from the primary storage 9, and to manage data transfers over the LAN 5.

Generally, backup systems organize the backup data derived from source data either in block format or in file format.

The block format treats source data as a list of fixed-size data-blocks. Each data block is tagged with physical location information, which is preserved together with the data. However, the block structure is flat, meaning that there is no association of blocks into a higher-level structure such as a file-system.

In contrast with the block format, the file format handles source data as a structure consisting of variable-size objects with a known and preserved mutual relationship. In the file format, each object contains data to which attributes are associated, but physical location information is not maintained in the file format. It is noted that the file format is the most widely used structure in backup systems, supporting data file structures, database file structures, operating system file structures, and the like.

From a backup storage operation point of view, the difference between block-formatted data and file-formatted data is that in the former, the source data is readable by any computer having access to the primary storage containing the source data. On the contrary, file-formatted source data is readable only by a computer capable of decoding the data structure. Therefore, the ability to read block-formatted data is not limited to a specific type of data reader. On the other hand, block-formatted backup methods may not be able to distinguish between blocks actually containing data and empty blocks, or invalid blocks, which blocks may unnecessarily increase the backup image to a size larger than needed.

In addition, block-formatted backup operation is faster, since source data is ordered sequentially, and read sequentially, thus decreasing the number of disk I/O operations and also decreasing the mechanical movements of disk R/W heads. File-formatted backup requires the assembly of each object after retrieval out of various physical locations on disk, which often requires multiple I/O operations as well as large movement of disks' R/W heads.

However, most existing backup systems organize data to be backed up in file format and not in block format. The reason is that, even though backup is faster and easier in block-format, when data is backed-up in block format it is complex and difficult to derive therefrom data to be restored into file-level format.

Restoring a partial set of files from backed-up data is the most frequent and important restoration operation, since almost all of the performed recovery operations deal with a single file, or with only a small set of files, typically the files in one directory. To avoid the problems related to block-format backup, existing backup systems are compelled to use the less-efficient file format in order to support file-level restore operations.

The FBSRD-method has the ability to store data in the faster for storage and more efficient block-format, while still being able to restore data in the more useful file-format. The FBSRD-method is also able to restore data in block-format, using the same stored block format backup data.

Still referring to FIGS. 3 and 4, the repository 15 is managed by the BA 17 as a file system, and block level data retrieved from workstations 1 and servers 3, or backup clients 4, is stored in a set of files in the repository. The contents of data blocks are stored in data files, while the location and attributes pertaining to the data blocks are indexed in look-up tables or LUTs, which are also saved in data files in the repository 15.

As mentioned above, the storage mode of the FBSRD supports the incremental data backup method, thus only backing up that data which is supplementary, such as data that has been modified when a snapshot is initiated for the first time in a sequence of successive snapshots, or has been modified, relative to a previous data backup snapshot. Incremental data backup differs from the Full backup method, which stores everything residing in the source devices, and differs also from the Differential-backup method, which saves all the data that has changed since the last fall backup.

When the FBSRD resides in storage mode, incremental data backup is achieved by monitoring all the changes entered to primary storage 9 during a certain period of time, and then, storing all the changes up to a specific point in time. The period of time is the interval between two successive snapshots, whereas the specific point in time is evidently the snapshot itself.

At the end of the first backup interval, thus after the first snapshot, there is a base-line image, thus a copy of the primary storage 9 in comparison to which changes are later related. The FBSRD method creates this base-line backup at the moment when the backup operation of a primary storage 9 is performed for the very first time, thus when there are yet no changes to list.

A snapshot contains all the data blocks residing in the primary storage 9 wherein data was held when the backup was initiated. To distinguish between blocks actually containing data and blocks void of data, the FBSRD analyzes the meta data contained in the data blocks pertaining to the file-system structure, also saved in the primary storage 9. The purpose of this analysis is to select only those data blocks which contain real data, as indicated by the information provided by the meta data. Blocks, which are not actually in use, are not copied to the repository 15.

When a computer runs complex computer program applications, such as database engines or e-mail servers, or when a number of applications are executed simultaneously, then the data stored on the computer's primary storage 9 is potentially prone to constant alteration.

Storing of backup data requires some definite length of time, and cannot be completed in a single point in time. Therefore, steps must be taken to maintain the consistency and the integrity of data. The aim of a protection method is to prevent a situation in which each file from a set of interrelated files is stored at a different time, with some of the alterations included in the snapshot and some excluded therefrom, thus violating the relationships between the various data items stored in the set. If a single file is large enough, for instance a large database file, the same problem may occur when an application alters a plurality of locations within the file, some of which had been stored already and some of which had not yet been stored.

Evidently, it is prohibitive to stop the operation of an entire computing facility while a snapshot is taken, just to prevent the possible alteration of the data throughout the duration of an ongoing snapshot. Obviously, it is required to both continue computing facility operation, and also to prevent alterations of data being backed up during a current snapshot. This last requirement is referred to as hot backup, as opposed to cold backup.

Cold backup refers to a backup method unable to protect the backed up data from alterations during the backup operation. Should the source data be modified during the snapshot execution time, then, the saved backup image may contain some data written to backup storage before, and some data written to backup storage after the modification occurred. Therefore, a cold backup may contain inconsistencies and is barred from operation with the FBSRD.

A hot backup however, as implemented by the FBSRD, will cope with simultaneously occurring snapshot and write operations, while still assuring a consistent backup image.

The method used by the FBSRD to protect data from alteration during the period of time needed for completion of the snapshot is called Copy On Write, or COW. When using the COW procedure, the FBSRD briefly delays each host write operation while reading the original data for backup purposes, before allowing the host write operation to proceed. The data written to the repository 15 is the original data read by the COW operation, and not necessarily the latest data currently on disk, which may be more recent relative to the point in time of the snapshot. Data that is not delayed from being written by the host at the time of the snapshot is read directly from the primary storage 9. It is noted that a COW operation relates to a single COW execution instance, while the COW procedure refers to all the COW operations performed during a snapshot.

A volume of primary storage 9 may be shared by a plurality of servers 3, in a configuration known as server cluster, which is not shown in the Figs. When backed-up data from a primary storage 9 coupled to a server cluster is transferred for storage, each server 3 out of the server cluster is protected by help of an agent computer program ACP 18, running in each one of the backup clients 4, against potential alterations possibly entered to the data while being stored in repository 15. When a single, or number of servers 3 carry legitimate instructions to modify, say to write, to the very same region, or target, in primary storage 9 designated for backup data storage, during an ongoing backup storage operation, then the backup appliance 17, or BA 17, resolves the conflict. This conflict pertains to priority, such as to which one ACP 18 has read the earlier original data, and which one ACP 18 has read data that has been stored later by another server 3 out of the server cluster. The BA 17 then copies only the earlier original data to the repository 15 and discards all copies of later, more recent data. Details regarding the BA 17 and the ACP 18 follow below.

In recovery mode, the FBSRD features a block-level or bare-metal recovery capability, as well as a file-level recovery capability. Further features of the FBSRD include capabilities such as browsing and queries, history and versions, and restoration of special attributes such as Access Control Lists (ACLs).

Block-level or Bare-metal recovery restores, in primary storage 9, an exact image of the previously backed up source data. The backup image is retrieved only from a block format backup and not analyzed for any data structure such as filesystem. The data is written in primary storage 9 to an area, or target, that is blocked from access by any other computer application program, or OS. After the recovery of the data is completed, the target in primary storage 9 may be made accessible to a computer's OS and allowed to be mounted. At that time, the original data structure, present in the original source data, is decoded by the OS and if a file system structure is present, the data is made accessible to a computer. This last provision is necessary to permit recovery even upon failure of the disk containing the OS of a computer. Else, it would be impossible to write recovered data to the OS, since an OS must be running in order to write files to a primary storage, and the files comprising the OS itself cannot be written to while the OS is running. In addition, it is noted that bare-metal recovery also provides the capability to recover from major disasters such as corruption of most of the files in a volume, or recovery from the physical failure of a disk, or of a computer. In case of a logical failure, data is just restored, but for a physical failure, the failed hardware is first replaced, and only then is data restored.

File-level recovery encompasses the restoration of files and directories. With the FBSRD, the contents of the recovered files, as well as the structure and directories of those files are recovered from backup storage in block-level format, and sent by the FBSRD to a computer attached to the LAN, which runs its own OS to make the data available for analysis by a computer program or for writing to a file-system. A typical use of file-level recovery is restoration of a small number of files and directories, in response to either human or machine errors.

File-level recovery attributes support browsing and querying abilities, which allow the FBSRD to locate and read files from the backed-up images without the need to actually restore these files to the server's primary storage 9. A file from any backup image can be opened directly by a computer program (in read-only mode) in order to view its contents. Furthermore, the file-level recovery attributes also support the restoration of special attributes, such as Access Control Lists (ACLs). It is noted that although a file may have a large number of attributes, all attributes are possibly recovered by the file-level recovery ability of the FBSRD.

The FBSRD operates a file-level recovery procedure enabling the restoration of data to file-level data configuration, by reading and retrieving data stored in the repository 15 in the block-level data configuration. When receiving a request for recovery of file data, the FBSRD assembles an image of the desired file, out of the data blocks residing in the repository 15. The file-level recovery procedure takes advantage of an intermediate mechanism, operating in parallel and automatically on the BA 17, to analyze block-level data for deriving therefrom both file-system structure and file-system organization. The analysis process scans the raw block-level backup image in the repository 15 for file-system organization, by first reading the type of file-system from the image, and then proceeds by applying a specific analysis method for each type of file-system. The analysis process proceeds iteratively through all elements of the file-system structure until all files and directories have been analyzed. The derived file-system structure is stored in the repository 15 as a catalog database for subsequent use during file-level restoration, when in recovery mode. Each catalog is associated with a specific snapshot, and is used to find data related to one snapshot.

There is another method of file-level recovery, which takes advantage of the direct access link 6 from the server 3 to the SAN 7 and does not require the BA 17 to access the data. A software program called Read File System, or RFS 20, is installed, if desired, in a server 3 coupled to the SAN 7. The RFS 20 creates a Read-Only virtual disk from the block-level backup data and from the LUT of a selected snapshot saved in the repository 15. The RFS 20 accepts block read requests emanating from the file-system of a server 3 and retrieves the requested data blocks from the snapshot data stored in the repository 15. The server's file-system converts these blocks of data into files, exactly in the same manner as for a regular data storage disk. This direct access facility allows any computer program application running on the server 3 to read files stored in the repository 15, as if they were regular files saved in primary storage 9. The RFS 20 reads file data through the SAN 7, thus as if the data was residing in a primary storage 9 attached directly to the server 3 and not through the LAN 5, avoiding the slowing down of the LAN 7 when a large amount of data is read from the snapshot. Computer program applications which maintain a set of large, complex files, e.g. database engines, can use this method to restore a specific object, e.g. a specific database table or item, without having to restore a large amount of data, as customary when using the application's regular procedures to copy objects from the backed-up image to the desired location.

All FBSRD recovery attributes provide the ability to track changes in the backed-up images in the form of chronological history and versions, as well as the retrieval of a full and exact copy of the original data as existing at the time the snapshot was taken and saved.

As seen in FIG. 3 and FIG. 4, the principal element of the FBSRD is the Backup Appliance 17, or BA 17, which is a dedicated computing unit. It is noted that the workstations 1, the servers 3 and the BA 17 are all computers with a CPU, a memory, and computer program reading means configured to operate computer programs, even though details are not shown in the Figs. The BA 17 handles most of the FBSRD's operations and runs a Backup Computer Program BCP, with a Backup Manager Computer Program 16, or BMCP 16, in interactive operation with an Agent Computer Program 18, or ACP 18, operating in each one of the backup clients 4, which are defined as the workstations 1 and the servers 3.

To control the operation of the FBSRD, there is provided a Backup Interface BUI 19 computer program operating from one of the workstations 1. The BUI 19 computer program presents the user with two interactive facilities, namely a text-based version and a graphical version.

The agent computer program ACP 18, running on each backup client 4 in parallel with all other computer programs, copes with the tasks of monitoring access to primary storage 9 for performing incremental data backups, meanwhile protecting data from alteration while being copied, and furthermore, reporting the status of the overall backup client configuration. Backup client configuration refers to the availability, address, and capacity of disks, volumes, databases, and the like.

The backup interface BUI 19, running on one of the workstations 1, is a stand-alone computer program used to control, manage, and program the mutual operation of the BA 17 and of the repository 15, in association with the other elements of the network system in the computing facility environment. The backup interface BUI 19 allows users thereof to view and modify backup jobs and FBSRD system parameters. For example, when in backup mode, the backup interface BUI 19 may be used to program the predetermined first initiation and the following time intervals for the automatic successive repetition of snapshot operations. Furthermore, when in recovery mode, the backup interface BUI 19 may request the restoration of a specific set of data.

The BA 17 communicates, via the LAN 5, with all the ACPs 18 active in the computing facility, and so does the BUI 19.

The BA 17, commanded or programmed by the backup interface BUI 19, manages both the storage mode and the recovery mode of the FBSRD system. Source data being copied, or backup images for restoration, are transferred from the primary storage 9, via the BA 17, to the repository 15. Possibly, the transfer of data between the primary storage 9 and the repository 15 is performed via the LAN 5, using the BA 17 and a backup client 4, and via the SAN 7. However, instructions commanding the process of data transfer are communicated solely over the LAN 5. It is pointed out that the repository 15, which may reside in any storage device or area accessible to the BA 17, may be accessed via the SAN 7, the LAN 5, or via the dedicated communication link 6.

When in storage mode, the BA 17 takes snapshots to copy data from primary storage 9 for backup into the repository 15. In parallel, each Agent Computer Programs ACP 18, operative in each one of the backup clients 4, keeps watch to prevent potential data alterations should a write command, directed from the backup client 4, attempt to access and modify data contained in a snapshot in process.

Block-level data copied by the backup appliance 17, or BA 17, is indexed for unique identification. The identification indices are saved in a look-up table (LUT), stored in association with the backed up data in the repository 15.

When in bare-metal recovery mode, also called block-level recovery mode, the BA 17 copies data designated to be restored from the repository 15 to primary storage 9, wherein which a region is allocated, indicated as a target, for the restore operation. After all the designated data has been copied, any file system residing in the allocated primary storage 9 may be attached, or mounted, to one or more of the backup clients 4 associated with the allocated primary storage 9. At the beginning of the restore operation, the ACP 18 prevents potential attempts by any backup client 4 to access the allocated region of primary storage 9 wherein the data is being restored, by dismounting or detaching any file system residing in the allocated primary storage 9 from the backup client(s) 4. The location of each data block to be restored is found in the look-up table (LUT) by help of the stored indices. After completion of the restore operation, the ACP 18 attaches or mounts, if desired, any file system residing in the allocated primary storage 9 again, to each backup client 4 from which it was previously dismounted.

When in file-level recovery mode, the BA 17 reassembles file-level data objects out of block-level data, or block data, stored in the repository 15. The BA 17 then sends the assembled data objects to a computer via the LAN 5, using network file-management protocols, such as NFS (Network File System) or CIFS (Common Internet File System). The computer in question then makes the file data available for analysis by user application computer programs, or uses its own OS and file-system to write the received file-level data objects to primary storage 9.

In addition, it is possible to access file-level data, or file data, by forwarding that data directly from a repository 15 attached to the server 3 via a SAN 7, without using the BA 17 via the dedicated communication link 6. When recovered via the SAN 7, file-level data is restored by help of a software computer program running in a server 3, referred to as the Read File System program or RFS 20, by which the repository 15 appears to the server 3 as if it was a formatted storage device disk.

Figure 5:
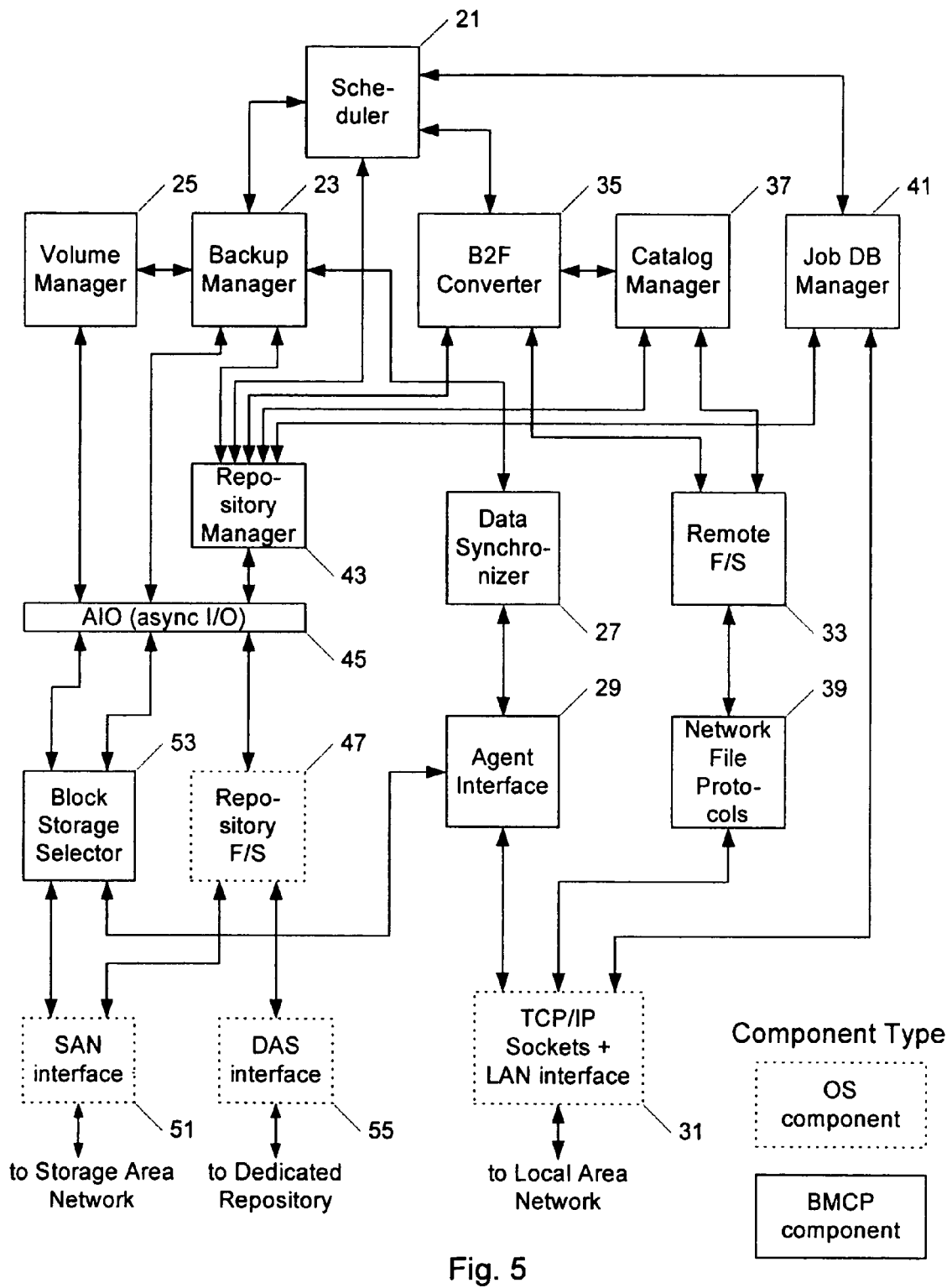
Figure 6:
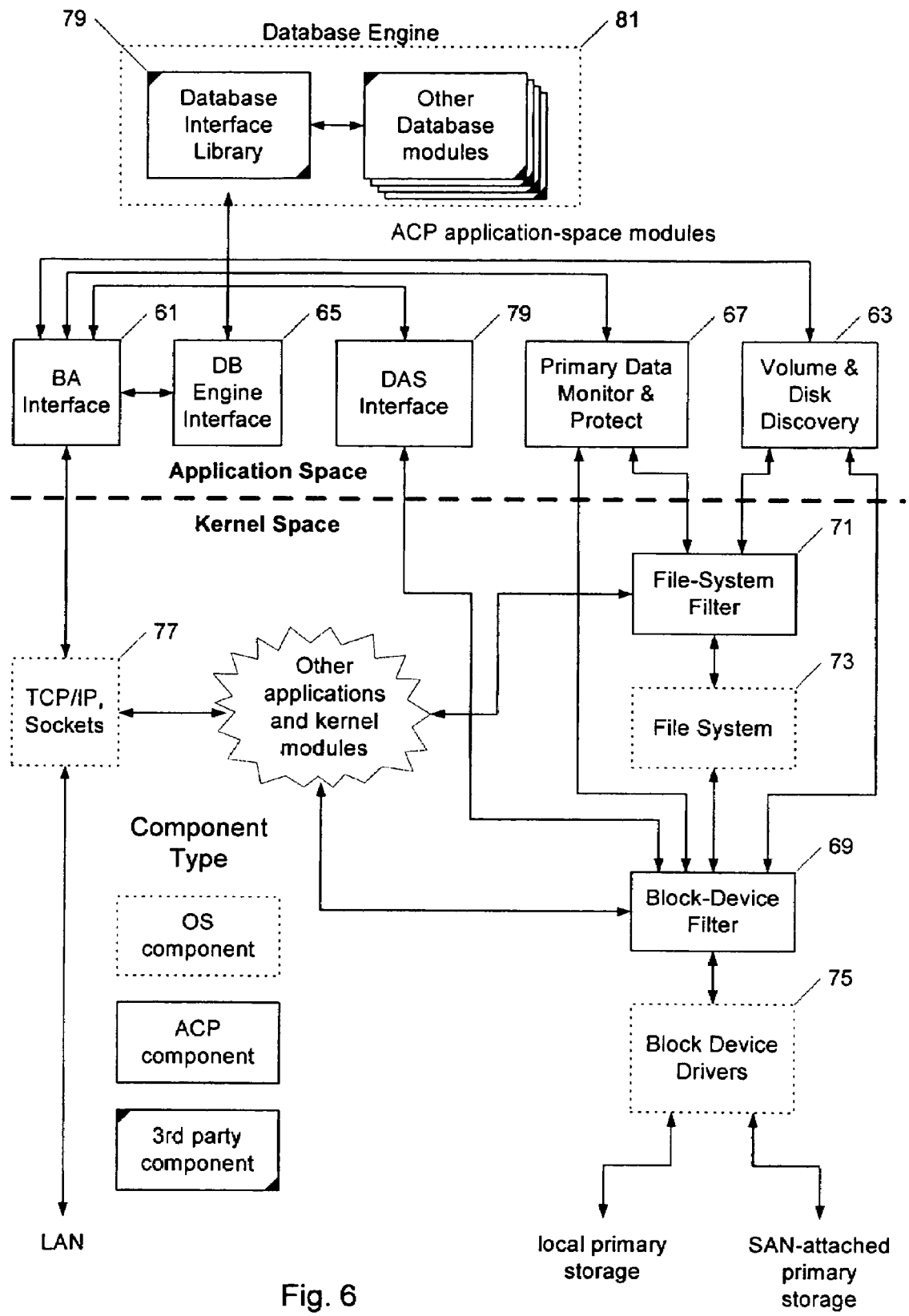

FIGS. 5 and 6 provide further details of the elements of a possible FBSRD system implementation. FIG. 5 shows most of the components of the Backup Manager Computer Program 16, or BMCP 16 running on the BA 17, and their mutual relation.

In FIG. 5, a scheduler 21 coupled to a backup manager 23 activates either one mode for storage and for recovery, such as, e.g. block level data backup storage, which is run at predetermined instants in time, and bare-metal recovery, operated when needed. The activities of the scheduler 21 are controlled by a job-and-client database, not shown in the Figs., but located in the repository 15 and managed by a job database manager 41. In addition, the scheduler 21 is also coupled to a block-to-file converter 35 operable to create a file-level catalog out of backed up data stored in the repository 15.

The backup manager 23 executes data backups when the FBSRD system operates in storage mode, and handles bare-metal data restoration when the FBSRD system operates in the recovery mode. For backup storage, the backup manager 23 reads source data from primary storage 9 and writes that read data into the repository 15.

When handling bare-metal restoration, the operation of the backup manager 23 operates in the reverse direction: data is read from the repository 15 and written to primary storage 9. The backup manager 23 is capable of executing concurrently multiple operations of both storage and bare-metal restoration.

As seen in FIG. 5, the backup manager 23 is also coupled to a volume manager 25, which maintains the disk layout and the logical volume management information derived from meta-data residing in primary storage 9. That information is used by the backup manager 23 to translate data block locations from client logical volume addresses to the physical disk locations.

In addition, when in storage mode, the backup manager 23 is further coupled to a snapshot data synchronizer 27 in charge of protecting data during a snapshot from suffering alterations while being read. In particular, the data received from the ACP 18 as a result from the operation of the Copy On Write (COW) procedure is synchronized with the data being read by the backup manager 27. The synchronization process compares the data read from primary storage 9 by the backup manager 23 with two sets of data received from the ACP 18 during the COW operation: the data read from primary storage 9 by the ACP 18, and the data written by the backup client 4 to the primary storage. If the data from the backup manager 23 matches the data written by the backup client 4, this indicates that the backup manager 23 has read altered data. In this case, the backup manager 23 saves in the repository 15 the data that has been read by the ACP 18, since it is the original data, thus the correct data for the snapshot.

For communication between the BA 17 and the agent computer program ACP 18 operating in each backup client 4, use is made of an application-level communication protocol handler designated as agent interface 29. Coupled thereto is the TCP/IP Sockets and LAN interface 31, which in turn, is coupled to the LAN 5. The Sockets and LAN interface 31 is supplied by the OS of the BA 17, and included in the Fig as reference only.

The block-to-file converter 35, mentioned-above as being coupled to the scheduler 21, provides the FBSRD system with access to the raw source data residing in primary storage 9 for operations at the file-system level. This access facility is activated for operations such as catalog building, file-level browsing and file restoration. The block to file converter 35 reads meta-data from a snapshot and analyzes it to detect and recognize the type of file system, and then analyzes file-system meta-data from the snapshot in the repository 15, selecting a specific analysis method by file-system type. The result of the analysis is used by the snapshot catalog manager 37 to build a catalog for later file-level browsing and restoration operations. The block to file converter 35 is also used in file-level restoration operations to assemble file data from block-level data in the repository 15. In addition, during backup storage operation, the block to file converter 35 is used for determining those locations in primary storage 9 that contain the files and directories for backup, thus valid data.

The snapshot catalog manager 37 is coupled directly to the block-to-file converter 35. The snapshot catalog manager 37 resides in either one of the two following modes: Catalog Storage mode and File Access mode.

Catalog Storage mode is activated after a snapshot has successfully been stored in the repository 15. The block to file converter 35 analyzes the snapshot for file system structure, which is then used by the snapshot catalog manager 37 to construct a catalog representing the file system structure of the snapshot, to save the catalog to the repository 15, and to add the catalog to a database of snapshot catalogs, not shown in the Figs., but managed by the snapshot catalog manager and also stored in the repository 15.

File Access mode is used for file level browsing and for file retrieval. The file access mode is activated by the Remote File System 33 when contacted by a computer over the LAN 5, for browsing or retrieval of files from a snapshot in the repository 15. The snapshot catalog manager 37 first locates the appropriate catalog in the snapshot catalog database matching the desired file, then uses the information recorded in the appropriate catalog to locate the desired file, and next, indicates to the block-to-file converter 35, the desired file for assembly and retrieval by the remote file system 33.

Both the block-to-file converter 35 and the backup catalog 37 are coupled to the remote file system unit 33, which is coupled in turn to a network file protocol unit 39, which units allow computers using the LAN 5, to gain access to backed-up data stored in the repository 15. Furthermore, the remote file system 33 and the network file protocol unit 39 transform backed-up data and make it appear as network files and directories to the computers, which are coupled to the network 5. The remote file system 33 creates and manages a virtual file system matching the file system structure contained in the catalog, while the network file protocol unit 39 communicates the structure and contents of the virtual file system to computers attached to the LAN 5, using standard network file protocols, such as Network File System (NFS) or Common Internet File System (CIFS).

A job database manager 41, also coupled to the TCP/IP sockets and LAN interface 31, is maintained for accessing and for updating a database of all scheduled jobs, client properties, job logs, and other tasks. The operation of the job database manager 41 is controlled by the BUI 19, and the two units communicate over the LAN 5 using the TCP/IP protocol, provided to the BMCP 16 by the TCP/IP sockets and LAN interface 31.

Central to the operation of the BA 17 is a repository manager 43, which is coupled to the scheduler 21, to the backup manager 23, to the block-to-file converter 35, to the snapshot catalog manager 37 and last, to the job database manager 41. The repository manager 43 is vital for the management of the data in the repository 15, for example, to manage dynamic storage allocations, to assign backup storage areas, and for handling tasks related to the operation and maintenance of the repository 15.

An Asynchronous I/O interface 45, or AIO 45, is an interface layer coupled to the backup manager 23, to the volume manager 25, and to the repository manager 43, for allowing the various subsystems to execute non-blocking I/O operations on the SAN 7, and also coupled to a dedicated storage interface 53. The AIO 45 allows reading and writing of multiple blocks of data in parallel, both from and to the primary storage 9, and from and to the repository 15, thus enhancing the performance of the FBSRD. A repository file system 47, possibly provided by the OS of the BA 17, is coupled to the AIO 45, for managing data in the repository 15 as a file-system structure. Moreover, a variety of data objects of different types are held in the repository file system 47, such as copies of blocks of data copied from primary storage 9, Look-Up Tables, catalog data, and configuration information.

A Block Storage Selector 53 is coupled between the AIO 45, the SAN interface 51 and the Agent interface 29. The Block Storage Selector 53 routes each data block read/write request sent to the SAN interface 51, or to the ACP 18, through the Agent interface 29 and via the LAN 5, according and depending upon the location of the primary storage device 9. Requests are tagged, and the Block-level data returned by primary storage devices 9, via either the SAN interface 51 or from the ACP 18 via the LAN 5, are routed back to the request's origin, as specified by the request's tag.

The SAN Interface 51, or host bus adaptor interface 51, operates on the BA 17 for communication with the SAN 7, and supports multiple adapters with load sharing abilities. The SAN Interface 51 is supplied by the BA's OS and included in FIG. 5 for reference only. Presently, the SAN Interface 51 supports FC adapters, or Fibre Channel adapters, but eventually, may also support additional SAN protocol adapters, such as iSCSI and InfiniBand adapters. The SAN Interface 51 is coupled to the Block Storage Selector 53 for access to SAN-coupled primary by the BMCP and also to the Repository File System 47 for access to SAN-coupled repository by the BMCP 16.

A Direct-Attached Storage (DAS) Interface 55 is coupled to a dedicated storage used for repository, not shown in the FIG. 5, and to the repository manager 43 through the AIO 45 and the Repository File System 47. The DAS Interface 55 is supplied by the OS of the BA 17 and included in FIG. 5 for reference only. It is noted that the repository 15 may be SAN-based, dedicated, or both.

Some primary modules and operations pertaining to the BA 17 are described below in brief.

Operation of the storage mode backup. The storage mode backup is operated by the backup manager 23, to copy data from primary storage 9 to the repository 15. The volume manager 25 translates the logical volume addresses used by the servers 3, to physical disk addresses, and the block-to-file converter 35 sets up a list of blocks containing valid file-system data, also called valid data block list, which is merged with lists of incremental data blocks received from the agent computer program ACP 18, running on all backup clients 4 having access to selected primary storage 9, to determine which blocks of data are to be backed up to the repository 15.

While the backup manager 23 copies blocks of data from primary storage 9 to the repository 15, the synchronizer module 27 interacts with the ACPs 18 running on each backup client 4 and with the backup manager 23 to which it is coupled, to preserve the integrity of the backed-up image. Data blocks to which a backup client 4 addresses write commands during an ongoing snapshot, are prone to suffer possible modifications, thus incur alterations to the data while the data blocks are being read. To prevent such possible data modifications, the data blocks residing in the repository are first read by the agent computer program ACP 18 before being written by the backup client 4, thus sent from the backup client 4 to the synchronizer 27, which merges the original data received from the agent computer program ACP 18 with the data addressed for writing to the repository 15, to preserve the integrity of the backed-up image.

Requests to read or write data from primary storage 9 are handled by the storage selector 53 in the following way: the storage selector 53 queries the volume manager 25 for routing information. The volume manager 25 returns routing information regarding the address of the specific target in primary, which is either a primary storage 9 coupled to the SAN 7, or another primary storage coupled directly, by Direct Attach Storage link DAS, to a specific backup client 4. The storage selector 53 then uses the routing information to send the data read/write request and, in case of a write operation, the data to be written, to the SAN interface 51, in case the primary storage is coupled to the SAN 7, or to a specific ACP 18 through the agent interface 29, when the storage is coupled to a backup client 4. Each command is "tagged" with the ID of the request originator, i.e. an identity tag specifying the ID of the operation performed and of the originating module, such as volume manager 25 and backup manager 23. Responses from both the SAN interface 51 and from backup clients 4, defining the completion status, such as success or failure, and, in case of a successful read operation, the data itself, are sent back to the originator using the ID tag appended to the request.

Storage of snapshot data in the repository: the repository 15 is managed by the BA 17 as a file system structure, with all the data from each snapshot saved to a distinct location thereon. When saving data blocks to the repository 15, the content thereof, which has been read from the primary storage 9, are saved to files in the repository 15, while data block location information is organized as lookup tables or LUTs, also saved as files to the repository 15. When recovery of a data block is desired, the information in the appropriate LUT is used for locating the file holding the data blocks' contents, as well as the precise locations of the blocks within the files, which are then read.

Operation of the snapshot catalog manager module 37. After completion of the snapshot storage operation, while in storage mode, the block-to-file converter 35 analyzes the block-level data saved by the snapshot in the repository 15, for the express purpose of extracting therefrom file-system information such as directory structure, file names and file attributes, such as file size and modification date. The results of this block-level data analysis are used by the snapshot catalog manager 37 to build a catalog of snapshots for storage in the repository. In addition, a list of all available snapshot catalogs is maintained by the snapshot catalog manager 37 in a catalogue database, for the purpose of locating any desired snapshot for recovery.

Bare-metal restoration operation. When in bare-metal recovery mode, required data and location information are retrieved by the backup manager 23 directly from the repository 15, and written to primary storage 9. Before a bare-metal restore operation starts, the ACP 18 forces the backup client 4 to dismount any file system volume located in the region of primary storage 9 being restored, to prevent the backup client 4 from accessing the primary storage region before completion of the restoration operation, thus while restoration is still incomplete.

When the primary storage 9 is attached to the SAN 7, then the BA 17 writes backed-up data directly to primary storage 9, via the SAN 7. However, when the primary storage 9 is attached directly to a backup client 4, then the BA 17 sends the data to be written to the ACP 18 via the LAN 5, and the ACP 18 writes the received data to the primary storage 9, bypassing the computer's file-system and accessing directly the primary storage.

File-level data restoration. Still with reference to FIG. 5, this task is handled by the remote file system 33, the network file protocol unit 39, by the block-to-file converter 35, and by the snapshot catalog manager 37, which are all mutually coupled. For the restoration of files, the remote file system 33 browses the file-system organization information residing in the database of the backup catalog 37. When files are selected for restoration, the information found in the snapshot catalog manager 37 is used to retrieve the data blocks pertaining to the files in the repository 15, from which data blocks files are subsequently assembled by help of the block-to-file converter 35. The recovered information is formatted to network file protocols, such as NFS or CIFS, by the network file protocol unit 39, and sent to a computer over the LAN 5. The computer then uses its own OS and file-system to make the recovered files available to applications or to write the recovered files to primary storage 9.

Management of the database of jobs to be executed by the FBSRD system. A database of jobs, or job DB, not shown in the Figs. but residing in the repository 15, contains all the necessary parameters for the execution of scheduled jobs for both storage mode and bare-metal recovery mode. A job database manager module 41, coupled to the backup interface (BUI) 19 via the LAN 5, shown in FIG. 4, and operated by an accredited user or by a system manager, permits that person to operate from a workstation 1 for viewing and modifying the job database. Display and modification of the job database is split between the job database manager module 41, running on the BA 17, used to access and modify the job database, and the backup interface BUI 19. The backup interface BUI 19 runs on a workstation 1, manned by a user or by the system manager, to display and edit job information. The job information being displayed and modified is transferred between the backup interface BUI 19 and the job database manager over the LAN 5, using the TCP/IP sockets and LAN interface 31 provided by the associated OS running on each backup client 4.

FIG. 6 shows details of the building modules of the agent computer program ACP 18 operating in each one of the backup clients 4. Specifically, FIG. 6 illustrates the mutual relations between the modules of the agent computer program ACP 18, of which some reside in the application space and some in the OS kernel space.

The five modules of the agent computer program ACP 18 residing in the application space and depicted in FIG. 6 consist of a Backup Appliance Interface 61, a Volume and Disk Discovery module 63, a DB Engine Interface 65, a Direct-Attached Storage (DAS) Interface 79, and a Primary Data Monitor 67. In addition, the ACP 18 includes two kernel-space modules, namely a Block-Device Filter 69, and a File-System Filter 71.

In the kernel space, three modules pertaining to the OS of a server 3 are shown coupled to the modules of the application space. These are the File System Module 73, the Block Device Driver 75, and the TCP/IP protocol engine and sockets interface 77.

In addition, the application space may contain database engine applications modules 81 such as Oracle or Exchange, to which, if desired, the ACP 18 may be coupled as well. Database engines usually incorporate an interface module with other applications, shown as a database interface library 79 in FIG. 6. A database interface library 79 is not mandatory and furthermore, it is unique to each database engine and has a unique interface, usually published by the database engine provider.

The file-system filter 71, running in the OS kernel space as a device driver or OS extension, is coupled to the file-system module 73. The file-system filter 71 intercepts every file I/O request sent to the OS, including File-I/O requests from the OS itself. The file-system filter 71 operates in one out of the two following modes: normal operation mode and file-system flush mode.

a. When in normal operation mode, all File I/O requests are passed by the file-system filter 71 to the file-system module 73, and all file-system responses are passed by the file-system filter 71 to the calling program.

b. When in file-system flush mode, the file-system filter 71 issues a command to the file-system to flush to disk all data cached in memory by the file-system module 73. While the cache-flush operation is in progress, all file-I/O requests from any program except from the ACP 18, are suspended.

The file-system filter 71 enters file-system flush mode at the start of each snapshot, upon receiving command from the ACP's 18 primary data protection module 67, and returns to normal operation mode when the file-system filter 71 reports completion of the cache-flush operation. The flushing operation ensures that all the file data on primary storage 9 is up to date at the start of the snapshot and that none is retained by the file-system cache.

The block-device filter 69, running in the OS kernel space as a device driver or OS extension, is coupled to the block-device drivers 75. The block-device filter 69 intercepts and processes every block-device I/O request sent to the block-device driver 75. The block-device filter 69 passes Read commands, and control/status requests to the block-device drivers 75. Write requests are suspended while the block-device filter 69 queries the ACP's 18 primary data monitor 67 whenever the write request should be protected.

a. When the primary monitor 67 indicates that the write operation should be protected, then the block-device filter 69 sends a read-block request to the block-device drivers 75. After the read request is completed, the block-device filter 69 allows the write operation to proceed, while transferring the read data to the primary data monitor 67.

b. When the primary data monitor 67 indicates that the write operation should not be protected, then the block-device filter 69 forwards the write request immediately to the block-device drivers 75. While the write request may not be protected, the targeted primary storage location may still be added to the list of incremental blocks by the primary data monitor 67.

It is noted that the access of all computer program applications, including the ACP 18, and all OS components to the file system module 73 pass via the file-system filter 71. Furthermore, the ACP 18 has special commands for the file-system filter 71. It is also mentioned that the access of all computer program applications, which access primary storage directly, and OS components, to the block device drivers 75 is achieved via the block device filter 69.

The five application-space modules of the agent computer program ACP 18 are described below.

First, the backup appliance interface 61, serves as the application-level communication protocol handler between the agent computer program ACP 18 and the BA 17 to which it is coupled. It is noted that each ACP 18 is possibly coupled to more than one BA 17. As described above, the agent computer program ACP 18 is controlled by the BA 17.

Second, the volume and disk discovery module 63, which is coupled to the backup appliance interface 61, to the file-system module 73 via the file-system filter 71, and to the block device drivers 75 through the block device filter 69, is charged with the task of recognizing all the primary storage resources, namely all the file system volumes and all the physical disks made available to the backup client 4. The status of those primary storage resources is updated on a continuous basis, and forwarded via the backup appliance interface 61, to the BA 17. It is with the help of the primary storage resources updates that the BA 17 is able to determine which physical disk areas should be copied when storing or when recovering a snapshot associated with each specific backup client 4.

Third, the DB engine interface 65, which is coupled to the backup appliance interface 61 and to the database interface library 79, is a module with two functions: the first function is to detect the existence and location of database objects for backup, and the second function is to make a DB engine, such as Oracle or Exchange, enter into a consistent state for backup.

Fourth, the primary data monitor 67, which is coupled to the backup appliance interface 61, to the block-device filter 69, and to the file-system filter 71, carries a threefold purpose:

a. To ensure that all data to be backed up resides on disk and not in internal server memory, by flushing the file-system cache into the disk at the start of a snapshot. This function is supported by the file-system filter 71, which causes the file-system to flush its cache to disk upon a command from the primary data monitor 75.

b. To prevent loss of data and to avoid data alteration when a backup operation is in progress, by intercepting write operations to primary storage 9 and by reading the original data to be backed-up before permitting the write operation to proceed. This operation is supported by the block-device filter 69, the operation of which is described by the following steps:

b1. The block-device filter 69 intercepts and suspends a write operation directed to the primary storage 9, b2. The block-device filter 69 queries the primary data monitor 67 about the desired operation, citing the location being targeted for write operation, b3. the primary data monitor 67 determines if the location matches a primary area being protected from changes during a snapshot and, if a match exists, notifies the block device filter 69 to protect the targeted primary storage location, while if a match does not exist, allows the block device filter 69 to complete the write operation, without any further operation from the ACP 18, b4. if the block device filter 69 receives notification from the primary data monitor 67 to allow completion of the write operation, then the suspended write operation is released and completes normally, b5. if the block device filter 69 receives notification from the primary data monitor 67 to protect the primary storage location, then, the block device filter 69 aims a read operation at the primary storage location being targeted for write operation, b6. after the read operation returns the data currently residing in the primary storage location, then the block device filter 69 allows the suspended write operation to be completed normally, while forwarding the data returned by the read operation to the primary data monitor 67, b7. when the primary data monitor 67 receives the data read from protected primary storage location by the block device filter 69, then it sends the data via the backup appliance interface 61, the TCP/IP sockets interface 77, and the LAN 5, to the BMCP, to be synchronized with the snapshot data being stored by the BMCP 16.

c. To continuously track changes occurring in primary storage 9 when there is no ongoing backup operation, as well as to detect and designate data blocks featuring incremental data, for backup storage purposes. This operation is supported by the block-device filter 69, and the operation is described by the following steps:

c1. same as b1 above.

c2. same as b2 above.

c3. the primary data monitor 67 determines that the location targeted for a write operation matches a primary storage area being monitored for changes, c4. the primary data monitor 67 allows the block device filter 69 to complete the write operation without protecting data against alteration, c5. the primary data monitor adds the altered location to a list of altered locations associated with the primary storage 9 being monitored, c6. the primary data monitor 67 receives a command from the BMCP 16 via the LAN 5, the TCP/IP sockets and LAN interface 77, and the backup appliance interface 61, to send the list of altered locations associated with a primary storage 9, and returns the list to the BMCP 16 via the same path, but in reverse direction.

Fifth, the direct-attach storage interface 79, which is coupled to the backup appliance interface 61 and to the block-device drivers 75 via the block-device filter 69, allows the BA 17 to access primary storage 9 at block-level through the LAN 5, even when the primary storage 9 is not otherwise accessible to the BA 17. This direct-attach storage interface 79 allows the BA 17 to backup and recover data from primary storage coupled as DAS. It is noted that the direct-attach storage interface 79 permits access to all primary storage devices, including SAN-attached primary storage 9. However, it is not efficient to access SAN-attached primary storage 9 via the direct attach storage interface 79.

To ensure communication between the backup appliance interface 61 and the LAN 5, use is made of the TCP/IP sockets and LAN interface 77, which are supplied by the OS of the backup client and are usually located in the kernel space. Likewise, the DB interface library 79, supplied by each database application provider, such as Oracle or Exchange, is coupled to the DB engine interface 65 to operate the DB application as required for backup operations.

The Read File System or RFS 20, shown in FIG. 4 as embodiment 200, is a software computer program, which can be used by a computer to access file-level data stored in a snapshot in the repository 15, without the intervention of the BA 17. The RFS 20 operates in a computer having access to a SAN-coupled repository 9, and converts the data stored thereon in a selected snapshot to a virtual read-only file system.

Figure 7:
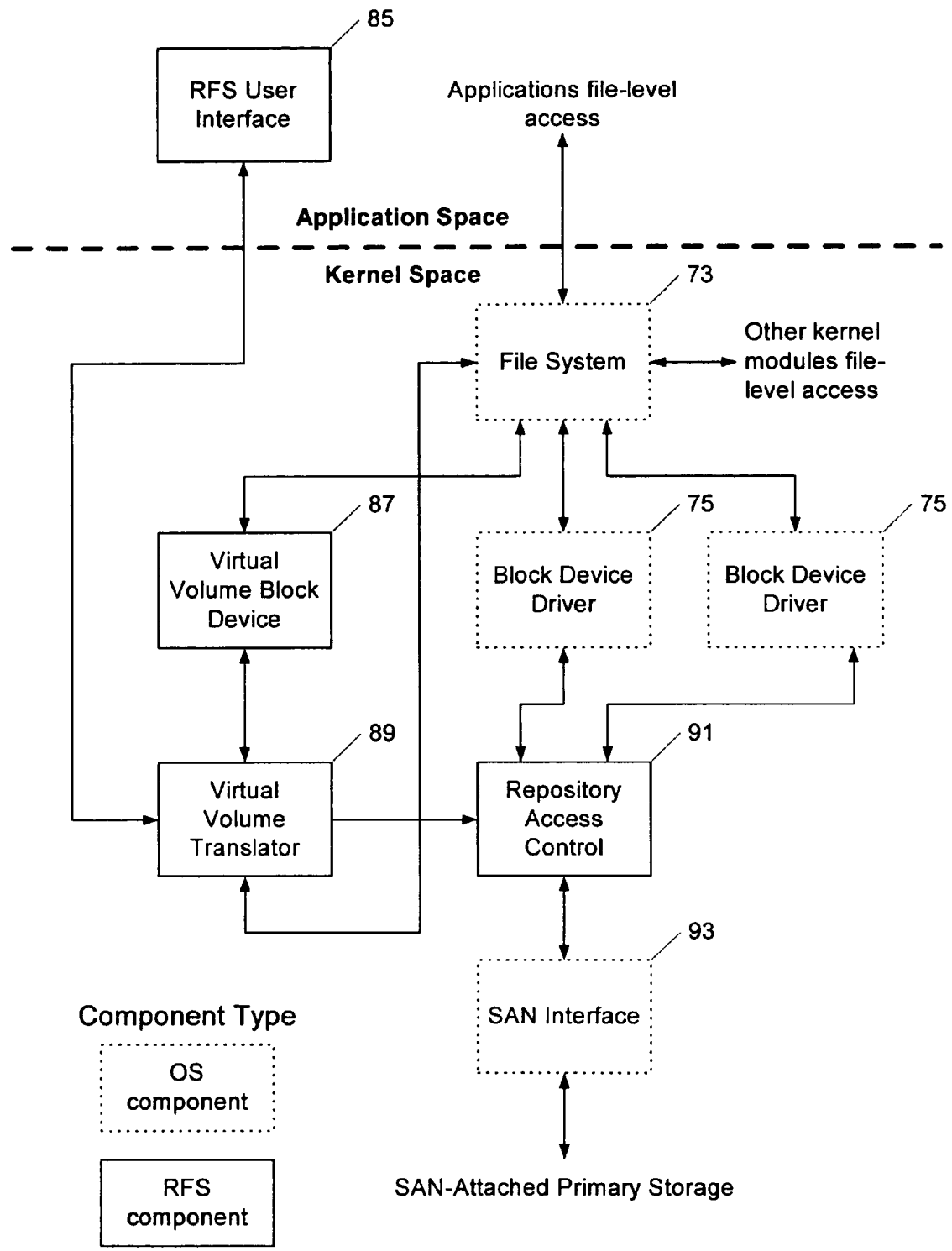
FIG. 7 illustrates the read file system of the FBSRD depicted in FIG. 3.

FIG. 7 shows details of the building modules of the Read File System 20 and illustrates the mutual relations between the modules of the RFS 20 and the OS modules of a computer.

An RFS user interface 85, which is the only RFS module operating in application space, is coupled to a virtual volume translator 89. The virtual volume translator 89 is used by the computer's operator to view the snapshots available in the repository 15, to select a snapshot for attaching or mounting as a virtual file-system volume, and to select the logical name of the virtual volume being mounted.

A virtual volume block device 87 is a kernel extension, coupled to the OS file-system module 73 and to the virtual volume translator 89. The virtual volume block device 87 is targeted by the file system module 73 when the file system requires reading or writing of data blocks from the virtual file system volume created by the RFS 20. The virtual volume block device 87 is accessed by the file system in the same way it accesses block device drivers 75, supplied by the OS itself to access regular file-system volumes.

The virtual volume translator 89 is a kernel extension, coupled to the OS file-system module 73, to the virtual volume block device 87, to a Repository Access Control 91 and to the RFS user interface 85. The virtual volume translator 89 accepts a snapshot and a virtual volume name from the RFS user interface 85, and selects this snapshot for translation. When the file system module 73 navigates the volume's file structure by reading data blocks containing file data and meta-data, the virtual volume translator 89 module accepts the data block requests from the virtual volume block device 87 and converts them to file-level data operations targeting the repository file-system structure. The virtual volume translator 89 also caches data block write operations from the file system module 73 in random-access memory, to allow temporary alteration of the data in the virtual file system.

The repository access control 91 is a kernel extension, coupled to the block device drivers 75, to the virtual volume translator 89 and to the SAN interface 93. The repository access control 91 prevents the file-system 75 from accessing the repository 15 as a file-system structure, for file I/O requests emanating from any program or kernel module except the virtual volume translator 89. This ensures that the repository 15 will not be modified, corrupted or destroyed by any computer program application.

The RFS 20 creates a virtual volume representing a snapshot by the following steps:

a. The operator uses the RFS user interface 85 to select a snapshot and assign a logical file-system volume name thereto. The configuration of the selected snapshot is copied to the virtual volume translator 87 for creating a new virtual file-system volume.

b. The virtual volume translator 89 creates a new virtual volume block device 87, with a logical name matching the name of the selected logical volume name, and couples the new virtual volume block device 87 to the file system module 73.

c. The file system module 73 starts navigating the file-system structure residing in the newly-attached virtual volume represented by the new virtual volume block device 87. To this end, data blocks are read from the volume containing file-system meta data. Then, the file system module 73 issues commands to the virtual volume block device 87, to read data blocks, specified by physical locations.

d. The virtual volume block device 87, which works mostly as a conduit, transfers each read data block request to the virtual volume translator 89.

e. The virtual volume translator 89 uses the file system module 73 to access the snapshot in the repository 15 as a file-system structure, for reading the LUT file associated with the requested block location, f. The virtual volume translator 89 analyzes the LUT data for name and location of the repository file containing the requested data block, g. The virtual volume translator 89 uses the file system module 73 to access the snapshot in the repository 15 as a file-system structure, for reading the file containing the contents of the requested block, h. The virtual volume translator 89 returns the contents of the selected block, via the virtual volume block device 87, to the file system module 73.

It is noted that the snapshot appears to the file system module 73 as a primary storage 9 with the same file-system structure contained therein when the snapshot was stored. For the file-system module 73 to access the stored file-system structure, the OS must be able to decode the type of file-system structure stored in the snapshot. For example, if the snapshot was taken from a volume formatted as UFS (Unix File System), an MS-Windows computer, which cannot normally read a UFS volume, will not be able to use the RFS 20 to access the snapshot as a file-system structure. This is different from file-level access through the BA 17, in which the BA itself provides the file-system structure.

It is further noted that the purpose of the repository volume control 91 is to make the repository 15, and all snapshots residing therein, invisible to the file-system module 73, except when the file-I/O requests are issued by the virtual volume translator 89. This ensures that access to the repository 15 is only possible via the virtual volume translator 89.

It will be appreciated by persons skilled in the art, that the present invention is not limited to what has been particularly shown and described hereinabove. Rather, the scope of the present invention is defined by the appended claims and includes both combinations and subcombinations of the various features described hereinabove as well as variations and modifications thereof which would occur to persons skilled in the art upon reading the foregoing description.

The invention claimed is:

1. A method for data storage and recovery, comprising:
   accepting files, which comprise data arranged in a file format supporting objects of variable size, for storage in a primary storage device having a file system;
   extracting the data for back-up from the primary storage device by producing incremental snapshots of the data on the primary storage device at successive time intervals;
   backing-up the extracted data by storing the incremental snapshots in a repository in accordance with a block format having fixed-size data blocks;
   prior to receiving a request to recover at least one of the files from the repository, processing the incremental snapshots in the repository so as produce file system information applicable at the successive time intervals; and
   in response to receiving the request, reading one or more of the incremental snapshots from the repository, and processing the read incremental snapshots using the previously-produced file-system information so as to reconstruct the data in the at least one of the files in accordance with the file format.

2. The method according to claim 1, wherein extracting and backing-up the data comprise communicating between the repository and the primary storage device over a Storage Area Network (SAN).

3. The method according to claim 1, wherein reading the one or more of the incremental snapshots is performed when at least some of the data in the primary storage device is unusable, and wherein the method comprises
   writing the at least one of the files containing the reconstructed data into the primary storage device.

4. The method according to claim 1, wherein processing the incremental snapshots to produce the file system information comprises, for a given snapshot, constructing and storing in the repository a catalog comprising the file system information and a Look-Up Table (LUT) comprising block-level data location information, such that the catalog and the LUT information are mutually-indexed for association with the data in the given snapshot, and wherein processing the read incremental snapshots using the previously-produced file-system information comprises associating indexed information stored in the catalog and in the LUT with respect to the at least one of the files, and recovering the at least one of the files using the associated information.

5. The method according to claim 4, wherein recovering the at least one of the files comprises accessing the repository over a network.

6. The method according to claim 1, wherein processing the read incremental snapshots using the previously-produced file-system information comprises communicating between the repository and the primary storage device over a Storage Area Network (SAN).

7. The method according to claim 1, wherein processing the read incremental snapshots using the previously-produced file-system information comprises connecting a computer to the repository via a Storage Area Network (SAN), running a Read File System (RFS) on the computer, creating, using the RFS, a representation of the data blocks stored in a selected snapshot in the repository, running another file system of the computer to obtain from the repository information that mutually indexes file system information and block-level data location information regarding the at least one of the files, so as to convert file data requests to block requests, accepting block read requests from the another file system of the computer and retrieving the data blocks requested in the block requests from the selected snapshot over the SAN.

8. The method according to claim 1, wherein processing the read incremental snapshots using the previously-produced file-system information comprises selecting a recovery format from a group of formats consisting of the block format and the file format, and processing the read incremental snapshots so as to produce the reconstructed data in accordance with the selected recovery format.

9. The method according to claim 8, wherein, when the selected recovery format comprises the block format, processing the read incremental snapshots comprises selecting a source snapshot, allocating a target location in the primary storage device for storage of the data that is recovered from the source snapshot, and copying the data from the source snapshot to the target location.

10. The method according to claim 9, wherein processing the read incremental snapshots comprises accessing the repository and the primary storage device over a Storage Area Network (SAN).

11. The method according to claim 9, wherein processing the read incremental snapshots further comprises temporarily protecting the target location from access operations when copying the data from the source snapshot.

12. The method according to claim 8, wherein, when the selected recovery format comprises the block format, processing the read incremental snapshots comprises:
   running a Read File System (RFS) on a server coupled to the repository via a Storage Area Network (SAN);
   selecting a source snapshot in the repository and representing the source snapshot as a selected file system;
   accessing file data and file meta-data related to the source snapshot using another file system running on the server;
   accepting requests by the RFS to read data blocks from the another file system directed to the source snapshot using data retrieved from a Look Up Table (LUT) pertaining to the source snapshot and stored in the repository, so as to locate in the repository the data blocks requested in the requests; and
   reading the data blocks requested in the requests from the repository.

13. The method according to claim 1, wherein extracting and backing-up the data comprise temporarily protecting the extracted data from write operations during extraction and backing-up of the data.

14. The method according to claim 1, wherein producing the incremental snapshots comprises including in a current snapshot only a selected subset of the data blocks that are detected as valid.

15. The method according to claim 1, wherein producing the incremental snapshots comprises including in a current snapshot only a selected subset of the data blocks that are detected as changed with respect to another snapshot preceding the current snapshot.

16. The method according to claim 1, wherein storing the incremental snapshots comprises:

running an agent on a client computer, which is connected locally to the primary storage device and by a network to the repository;

sending a command to the agent, via the network, to monitor a selected region of the primary storage device;

responsively to the command, running the agent for creating an initially-empty list of incremental data blocks residing in the monitored region, and assigning the list a unique ID;

using the agent, intercepting a write instruction sent from the client computer to the primary storage device, and adding to the list a location in the primary storage data location to which the intercepted instruction is targeted; and selecting and associating a snapshot storage operation with the unique ID assigned to the list, and copying the list from the client computer via the network.

* * * * *

UNITED STATES PATENT AND TRADEMARK OFFICE
CERTIFICATE OF CORRECTION

PATENT NO. : 7,596,713 B2
APPLICATION NO. : 11/122508
DATED : September 29, 2009
INVENTOR(S) : Mani-Meitav et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 772 days.

Signed and Sealed this

Twenty-eighth Day of September, 2010

David J. Kappos
*Director of the United States Patent and Trademark Office*